United States Patent
Ichikawa et al.

(10) Patent No.: US 7,003,437 B2
(45) Date of Patent: Feb. 21, 2006

(54) SYSTEM, METHOD AND PROGRAM FOR EVALUATING ENVIRONMENTAL LOAD

(75) Inventors: Yoshiaki Ichikawa, Tokai (JP); Takeo Koishi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/887,859

(22) Filed: Jul. 12, 2004

(65) Prior Publication Data

US 2005/0159930 A1     Jul. 21, 2005

(30) Foreign Application Priority Data

Jan. 20, 2004  (JP)  ............................. 2004-012407

(51) Int. Cl.
   *G06F 15/00*    (2006.01)
(52) U.S. Cl. ..................... 702/189; 709/211; 703/22
(58) Field of Classification Search ............... 702/189, 702/84, 179, 181, 182–185; 703/22; 707/3, 707/6, 7; 709/211
   See application file for complete search history.

(56) References Cited

U.S. PATENT DOCUMENTS

2003/0105832 A1 *   6/2003   Kaneko ..................... 709/217
2003/0236776 A1 *  12/2003   Nishimura et al. ............ 707/3
2004/0054516 A1 *   3/2004   Oyasato et al. ............... 703/22

FOREIGN PATENT DOCUMENTS

| JP | 2001-56708   | 2/2001  |
|----|--------------|---------|
| JP | 2001-310179  | 11/2001 |
| JP | 2003-196430  | 7/2003  |

* cited by examiner

*Primary Examiner*—Edward Raymond
(74) *Attorney, Agent, or Firm*—Antonelli, Terry, Stout and Kraus, LLP.

(57) ABSTRACT

The invention provides an information management technology which evaluates environmental load information of a product. A system comprises a parts construction database which stores parts numbers, type information and relation information thereof, an environmental load information database which stores environmental load information of the parts, an evaluation rule storage unit which stores an evaluation rule of the environmental load, an evaluation processing unit which extracts the environmental load information of type number information associated with one parts number and judges whether or not corresponding type number information can be an evaluation object type number of the environmental load, a parts totalization processing unit which extracts the environmental load information, totalizes the environmental load information for each master parts or for each product and generates total information of the environmental load information, and an output processing unit which outputs total information.

8 Claims, 11 Drawing Sheets

PN (Parts Name) TABLE — 201

| PARTS NUMBER | NAME |
|---|---|
| AA-8S-C001 | FULL AUTOMATIC WASHING MACHINE |
| AA-8S2-B017 | UPPER COVER ASSEMBLY |
| AA-8S2-A017 | FRONT PANEL ASSEMBLY |
| AA-8S2-024 | SCREW CAP |

FIG. 4

PS (Parts Structure) TABLE — 202

| MASTER PARTS NUMBER | SLAVE PARTS NUMBER | QUANTITY |
|---|---|---|
| AA-8S-C001 | AA-8S2-B017 | 1 |
| AA-8S-C001 | AA-8S-B001 | 1 |
| AA-8S2-B017 | AA-8S2-A017 | 1 |
| AA-8S2-A017 | AA-8S2-024 | 4 |

PN (Parts Name) TABLE

| MAKER ID | MAKER TYPE NUMBER | PARTS NUMBER | NAME | WEIGHT (kg) |
|---|---|---|---|---|
| COMPANY1 | Y100101 | 0000C1 | PARTS C1 | 0.1 |
| COMPANY2 | ACZ05001 | 0000C2 | PARTS C2 | 0.5 |

SN (Substance Name) TABLE

| SUBSTANCE NUMBER | NAME |
|---|---|
| 0000N1 | SUBSTANCE N1 |
| 0000N2 | SUBSTANCE N2 |
| 0000N3 | SUBSTANCE N3 |
| 0000N4 | SUBSTANCE N4 |

PS (Parts Structure) TABLE

| MAKER ID | MAKER TYPE NUMBER | SUBSTANCE NUMBER | CONTENT | CONSUMED ENERGY | EMISSION AMOUNT |
|---|---|---|---|---|---|
| COMPANY1 | Y100101 | 0000N1 | 0.01 | 5kw | A SUBSTANCE :10kg |
| COMPANY1 | Y100101 | 0000N2 | 0.03 | - | - |
| COMPANY1 | Y100101 | 0000N3 | 0.1 | - | - |
| COMPANY2 | ACZ05001 | 0000N1 | 0.01 | 7kw | B SUBSTANCE :7kg |
| COMPANY2 | ACZ05001 | 0000N4 | 0.02 | - | - |

EXAMPLE OF PARTS CONSTRUCTION INFORMATION

OPERATION OF PARTS TOTALIZATION PROCESSING UNIT s601
VALUE OF WEIGHT FILED OF PN TABLE (301) OF END-PARTS AND PERCENTAGE SUBSTANCE WEIGHT OF EACH SUBSTANCE OF PS TABLE (303) ARE MULTIPLIED AND ADDED AND WEIGHT OF EACH SUBSTANCE CONTAINED IN PARTS IS CALCULATED s602
WEIGHT OF SUBSTANCE CONTAINED IN MASTER PARTS IS CALCULATED FROM WEIGHT OF SUBSTANCE CONTAINED IN END-PARTS IN ACCORDANCE WITH PS TABLE (202) OF PARTS CONSTRUCTION s603
WEIGHT OF SUBSTANCE CONTAINED IN MASTER PARTS IS FURTHER CALCULATED IN ACCORDANCE WITH PS TABLE (202) OF PARTS CONSTRUCTION s604 IS PARTS OF TOP LEVEL REACHED? NO

YES s605
PARTS NUMBER OF TOP LEVEL PARTS AND WEIGHT OF SUBSTANCE NUMBER OF EACH SUBSTANCE CONTAINED ARE TOTALIZED AND OUTPUTTED

FIG. 13A
EXAMPLE OF PROCUREMENT PARTS INFORMATION

FIG. 13B
EXAMPLE OF PROCUREMENT PARTS INFORMATION

FIG. 14
PN (Parts Name) TABLE — 701

| MAKER ID | MAKER TYPE NUMBER | PARTS NUMBER | NAME | WEIGHT (kg) |
|---|---|---|---|---|
| COMPANY1 | Y100101 | 0000C1 | PARTS C1 | 0.1 |
| COMPANY2 | Z0AB001 | 0000C1 | PARTS C1 | 0.11 |

FIG. 15
PS (Parts Structure) TABLE — 703

| MAKER ID | MAKER TYPE NUMBER | SUBSTANCE NUMBER | CONTENT | CONSUMED ENERGY | EMISSION AMOUNT |
|---|---|---|---|---|---|
| COMPANY1 | Y100101 | 0000N1 | 0.01 | 5kw | A SUBSTANCE : 10kg |
| COMPANY1 | Y100101 | 0000N2 | 0.03 | – | – |
| COMPANY1 | Y100101 | 0000N3 | 0.1 | – | – |
| COMPANY2 | Z0AB001 | 0000N1 | 0.05 | 7kw | B SUBSTANCE : 7kg |
| COMPANY2 | Z0AB001 | 0000N3 | 0.1 | – | – |

※SN (Substance Name) TABLE IS EQUAL TO THAT OF FIG. 7

801 TABLE INCLUDING EXTRACTED RECORDS

| MAKER ID | MAKER TYPE NUMBER | PARTS NUMBER | SUBSTANCE NUMBER | CONTENT |
|---|---|---|---|---|
| COMPANY1 | Y100101 | 0000C1 | 0000N1 | 0.01 |
| COMPANY1 | Y100101 | 0000C1 | 0000N2 | 0.03 |
| COMPANY1 | Y100101 | 0000C1 | 0000N3 | 0.1 |
| COMPANY2 | Z0AB001 | 0000C1 | 0000N1 | 0.05 |
| COMPANY2 | Z0AB001 | 0000C1 | 0000N3 | 0.1 |

1041

901 HAZARD DATABASE

| SUBSTANCE NUMBER | HAZARD SCORE | THRESHOLD VALUE |
|---|---|---|
| 0000N1 | 100 | 0.02 |
| 0000N2 | 60 | 0.02 |
| 0000N3 | 10 | 0.2 |

105 EVALUATION RUE EDITION PROCESSING UNIT

902 EVALUATION EQUATION STORAGE UNIT

1042 EVALUATION UNIT

903

| MAKER ID | MAKER TYPE NUMBER | PARTS NUMBER | NAME | WEIGHT |
|---|---|---|---|---|
| COMPANY1 | Y100101 | 0000C1 | PARTS C1 | 0.1 |

RE-EVALUATE HAZARD SCORE HI FOR ALL SUBSTANCE NUMBERS I IN THE FOLLOWING WAY:

if wi > THRESHOLD VALUE, then Hi = 1000

1002

EVALUATE ENVIRONMENTAL IMPACT EVALUATION DEGREE Y FOR ALL SUBSTANCE NUMBERS I IN THE FOLLOWING WAY:

$$y = \text{PARTS WEIGHT} \times \left( \sum_{\text{SUBSTANCE}} w_i \times H_i \right)$$

SYSTEM, METHOD AND PROGRAM FOR EVALUATING ENVIRONMENTAL LOAD

BACKGROUND OF THE INVENTION

This invention relates to an environmental load evaluation system, an environmental load evaluation method and an environmental load evaluation program. More specifically, the invention relates to an information management technology of products that will be suitable for content evaluation of environmental impact substances and environmental load inventory evaluation.

A method called "LCA (Life Cycle Assessment)" for quantitatively evaluating a total environmental load of a certain product from its production till its disposal has been studied. To execute this LCA, an object product is first disassembled into parts. A product is generally constituted by parts and the parts are further constituted by slave parts. When the slave parts are serially assorted into sub-slave parts in a master-slave relation, end-parts that cannot be assorted any longer remain. Environmental load information of the end-part is the starting point of calculation-of the environmental load information of each product. When the weight is serially built up from a layer of the end-parts up to a layer of master parts, the weight of the product can be calculated. When the contents of environmental impact substances such as heavy metals are serially built up, the total content of the environmental impact substances of the product can be acquired.

On the basis of the concept described above, a technology that adds environmental load information by using information collected from parts construction of a product and information acquired from a business acquaintance and calculates environmental load information of the product is known.

In an environmental information management system for managing a variety of environmental information useful for diversified environmental evaluation and management by grasping impacts on the environment that occurs in the stage selected from among a plurality of stages including raw materials of a product used, a period during production, a period during the use of the product, a time of disposal of the product and recycle of the product, the technology described above is proposed as an environmental information management system (JP-A-2003-196430) including an environmental information unification management unit that uniformly manages a plurality of environmental databases storing various kinds of environmental information, discriminates a storage position of necessary data from a plurality of environmental databases in accordance with a requirement of a user for executing environmental evaluation and management and for acquiring data, converts the data so acquired to integrated information having a unified format and provides the integrated information to the user as the requesting party.

SUMMARY OF THE INVENTION

The prior art technology described above is based on the assumption that parts from end-parts till parts of upper levels of the layers can be primarily stipulated. In practice, however, the same parts number is set when specification such as strength, performance, size, etc, is the same even though characteristics of loads applied to the environment such as contents of environmental load substances are different.

When a designer designates parts when designing a product, for example, the designer makes part designation by use of the parts number described above. On the other hand, when the parts are procured in accordance with the parts designation based on this parts number, the parts having the same specification as the specification corresponding to the parts number are often procured from a plurality of parts makers. Therefore, there is actually the case where a plurality of parts having different environmental load characteristics exists for one kind of parts from the aspect of design (that is, the parts having the same parts number).

In other words, in order to evaluate the environmental load information of a product, the environmental load information of the parts constituting the product must be built up in accordance with the parts number. Nonetheless, there is no means for precisely judging which environmental load information of which product must be calculated on the basis of which parts because a plurality of parts having the same parts number but mutually different environmental load information exists.

It is therefore an object of the invention to provide an information management technology that will be suitable for evaluating environmental load information of a product. More concretely, the invention makes it possible to appropriately handle those parts which have different environmental load characteristics though they have the same parts number in environmental load evaluation.

An environmental load evaluation system according to the invention for accomplishing the object described above comprises a parts construction database for storing a parts number determined for specification of each parts constituting a product, type number information determined for each parts constituting the product and information of a master-slave relation between a master parts and slave parts constituting the master parts, in association with one another; an environmental load information database for storing environmental load information of the parts constituting the product for each of the type number information; an evaluation rule storage unit for storing an evaluation rule of an environmental load; an evaluation processing unit for extracting from the environmental load information database environmental load information relating to one or a plurality of type number information associated with one parts number on the basis of association of a parts number and type number information in the parts construction database, applying the environmental load information so extracted to the evaluation rule of the evaluation rule storage unit and judging whether or not corresponding type number information can be an evaluation object type number of the environmental load as a representative of the parts number; a parts totalization processing unit for extracting the environmental load information of the evaluation object type number from the environmental load information database, totalizing the environmental load information for each of the evaluation object type numbers for each master parts or for each product on the basis of the parts construction database and generating total information of the environmental load information; and an output processing unit for outputting the total information of the environmental load information to an output interface.

An environmental load evaluation method according to the invention uses an information processing unit comprising a parts construction database for storing a parts number determined for specification of each parts constituting a product, type number information determined for each parts constituting the product and information of a masterslave relation between a master parts and slave parts constituting the master parts, in association with one another; an environmental load information database for storing environmental load information of the parts constituting the product for each of the type number information; and an evaluation rule storage unit for storing an evaluation rule of an environmental load; the method comprising the steps of extracting from the environmental load information database environmental load information relating to one or a plurality of type number information associated with one parts number on the basis of association of a parts number and type number information in the parts construction database, applying the environmental load information so extracted to the evaluation rule of the evaluation rule storage unit and judging whether or not corresponding type number information can be an evaluation object type number of the environmental load as a representative of the parts number; extracting the environmental load information of the evaluation object type number from the environmental load information database, totalizing the environmental load information for each of the evaluation object type numbers for each master parts or for each product on the basis of said parts construction database and generating total information of the environmental load information; and outputting the total information of the environmental load information to an output interface.

An environmental load evaluation program according to the invention is a program for causing an information processing unit to execute evaluation of an environmental load of a product, the information processing unit comprising a parts construction database for storing a parts number determined for specification of each parts constituting said product, type number information determined for each parts constituting the product and information of a masterslave relation between a master parts and slave parts constituting the master parts, in association with one another; an environmental load information database for storing environmental load information of the parts constituting the product for each of the type number information; and an evaluation rule storage unit for storing an evaluation rule of an environmental load; the program comprising the steps of extracting from the environmental load information database environmental load information relating to one or a plurality of type number information associated with one parts number on the basis of association of a parts number and type number information in the parts construction database, applying the environmental load information so extracted to the evaluation rule of the evaluation rule storage unit and judging whether or not corresponding type number information can be an evaluation object type number of the environmental load as a representative of the parts number; extracting the environmental load information of the evaluation object type number from the environmental load information database, totalizing the environmental load information for each of the evaluation object type numbers for each master parts or for each product on the basis of the parts construction database and generating total information of the environmental load information; and outputting the total information of the environmental load information to an output interface. This program has codes which execute above each process.

Other problems and solution methods thereof disclosed by the invention will become more apparent from the following description of aspects of the invention taken in conjunction with the accompanying drawings.

The invention can provide an information management technology suitable for evaluating environmental load information of a product. More concretely, the invention makes it possible to suitably handle those parts which have the same parts number and yet have different environmental load characteristics in environmental load evaluation.

Other objects, features and advantages of the invention will become apparent from the following description of the embodiments of the invention taken in conjunction with the accompanying drawings.

DESCRIPTION OF THE EMBODIMENT

Figure 1:
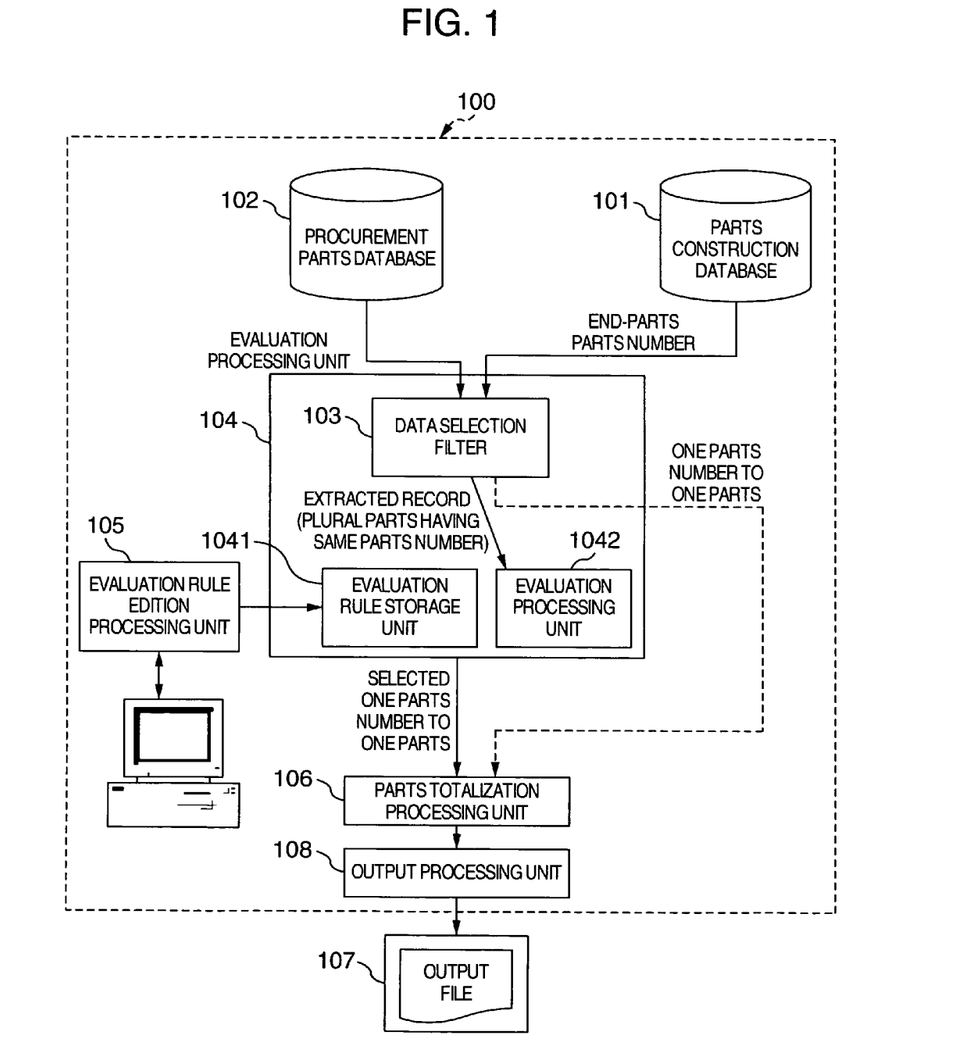
FIG. 1 is a schematic view of an environmental load evaluation system according to an embodiment of the invention.

A preferred embodiment of the invention will be hereinafter explained in detail with reference to the accompanying drawings. FIG. 1 is a schematic view of an environmental load evaluation system according to an embodiment of the invention. The environmental load evaluation system 100 of this embodiment includes a parts construction database 101, a procurement parts information database 102 as an environmental load information database, a data selection filter 103, an evaluation processing unit 104, an evaluation rule edition processing unit 105, a parts totalization processing unit 106 and an output processing unit 108. This system 100 can be connected to an output interface 107 through an appropriate interface or network.

Figure 2:
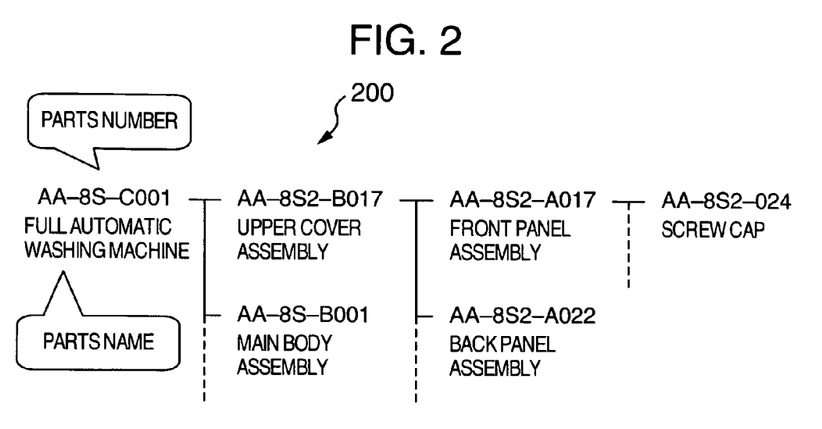
FIG. 2 shows an example of a tree structure of a parts construction database in the embodiment of the invention.

Hereinafter, each constituent unit constituting the system 100 described above will be explained. FIG. 2 shows an example of a tree structure of the parts construction database in the embodiment of the invention. The parts construction database 101 stores a parts number allocated to each specification of parts constituting a product, type number information determined for each parts constituting the product and master-slave relation information of a master parts among the parts numbers of the parts and slave parts constituting the master parts in association with one another. In other words, the parts construction database 101 stores a tree structure of the parts constituting a certain product as the master-slave relation information among the parts numbers.

Figure 3:
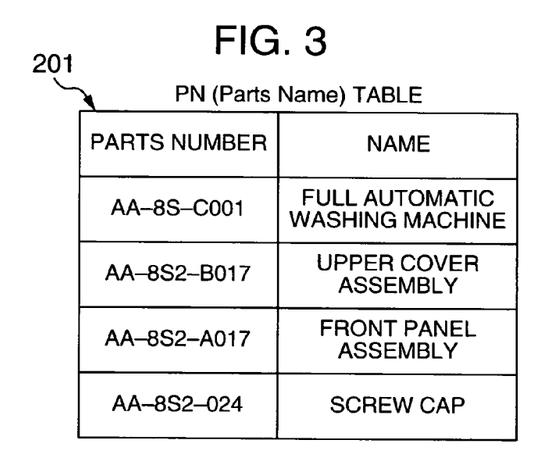
FIG. 3 shows an example of a parts name table of the parts construction database in the embodiment of the invention.

It will be assumed that a parts construction of a certain product (e.g. full automatic washing machine) has a tree structure 200 shown in FIG. 2. It will also be assumed that a data record representing the relation between each parts number and each parts name is called "PN (Parts Name) record" and a table storing this PN record is a "parts name table 201". FIG. 3 shows an example of the parts name table of the parts construction database in the embodiment. The parts name table 201 has fields of parts names with a parts number field as each key.

Figure 4:
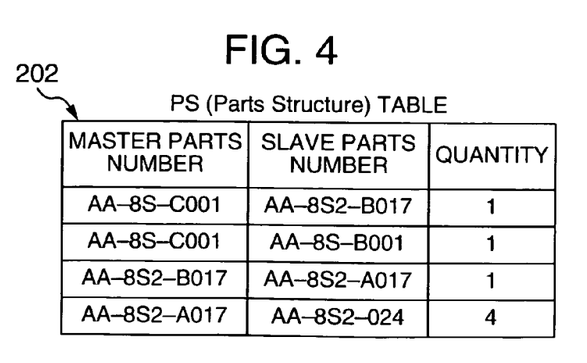
FIG. 4 shows an example of a parts structure table of the parts construction database in the embodiment of the invention.

On the other hand, it will be assumed that each data record constituting the tree structure shown in FIG. 2 is called "PS (Parts Structure)" record and a table storing this PS record is a "parts structure table 202". The parts structure table 202 is the one that represents the master-slave relation of the parts numbers and the numbers of the slave parts. The table structure that can completely represent the tree structure 200 described above by this table has fields of the parts numbers of the slave parts and their numbers (quantity). Incidentally, as to end-parts not having the slave parts, a record using its parts number as a master parts number (that is, the key described above) does not exist.

The procurement parts database 102 (environmental load information database) provided to the system 100 is a database that stores the environmental load information of the parts constituting the product (end-parts described above) for each type number information of the parts. This database 102 stores, for example, the record of each end-parts such as an ID of a maker of the end-parts, the type number information of the end-parts in the maker, the parts number having a coincident specification, a parts name, identification information of raw materials used and weight. Incidentally, almost all of the end-parts used for the product are generally and in most cases those parts which are procured from other makers. However, even those end-parts that are manufactured inside the own company can be stored as the procurement parts in this information database.

Figure 5A:
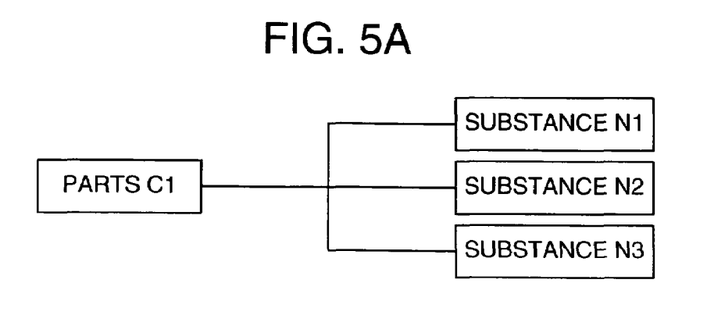
FIGS. 5A and 5B show an overall construction of a procurement parts database in the embodiment of the invention.
Figure 5B:
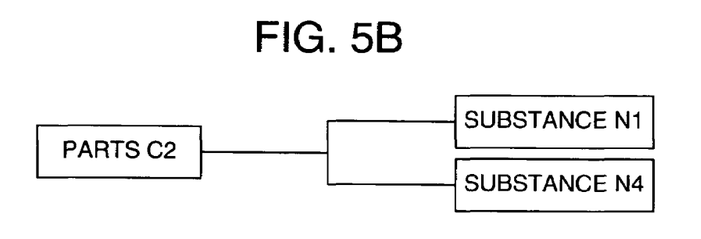

The procurement parts database 102 will be explained in detail with reference to the drawings. FIGS. 5A and 5B show an overall construction of the procurement parts database 102 in this embodiment. It will be assumed that the end-parts stored in this database 102, that is, the procurement parts, are C1 and C2. These parts C1 and C2 have the feature that environmental load information such as information of materials constituting these parts and information of ingredients is added.

Figure 6:
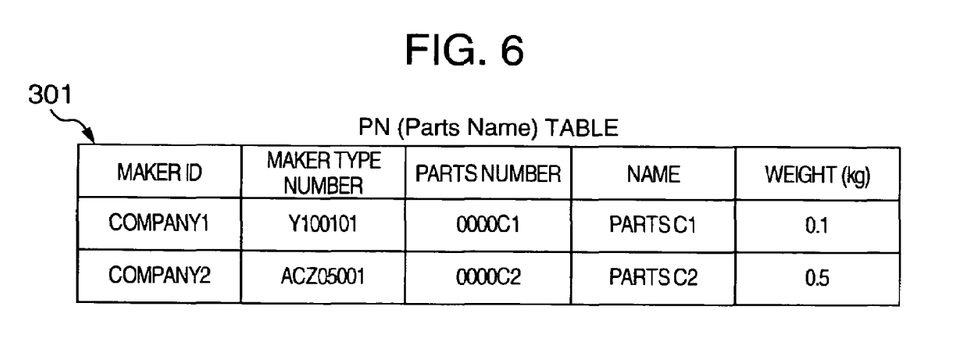
FIG. 6 shows an example of a parts name table of the procurement parts database in the embodiment of the invention.
Figure 7:
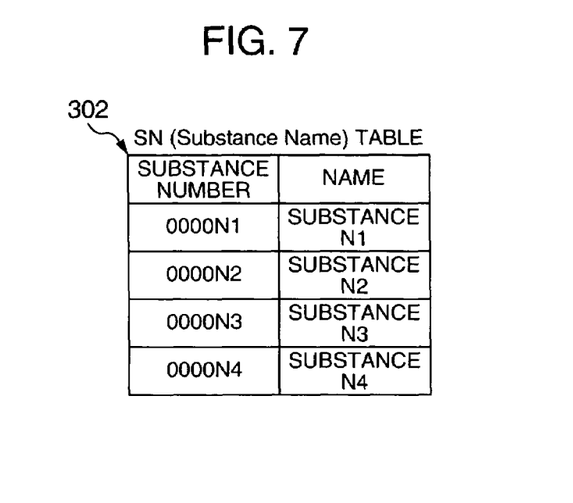
FIG. 7 shows an example of a substance name table of the procurement parts database in the embodiment of the invention.

As shown in FIG. 6, an identifier of a maker, a type number of the maker, a parts number, a parts name and a weight of parts exist as fields in the PN table 301 for the procurement parts. On the other hand, an SN (Substance Name) table 302 for storing information of environmental load substances as the origin of the environmental load information exists besides this PN table 301. In the example shown in FIG. 7, information of ingredients contained in the parts are assumed as an example of the environmental load information. In this table 302, the names of the ingredients are defined with the substance numbers as the key.

Figure 8:
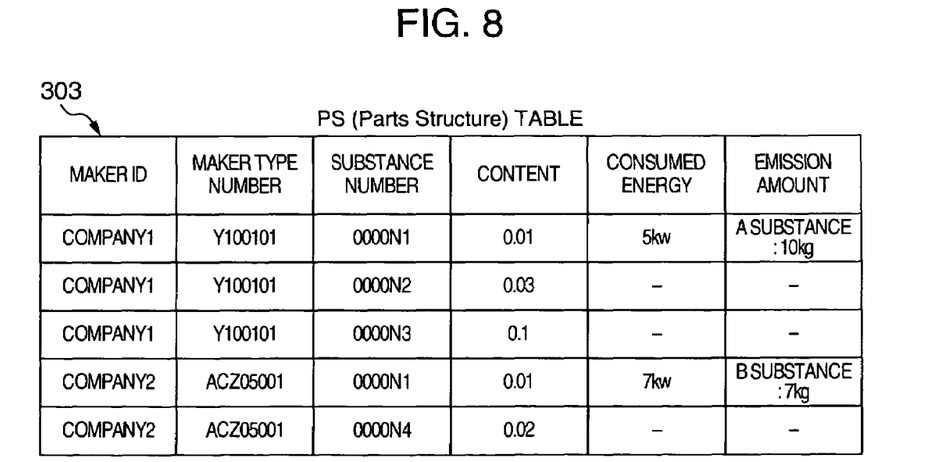
FIG. 8 shows an example of a parts structure table of the procurement parts database in the embodiment of the invention.

As shown in FIG. 8, the PS table 303 in this procurement parts database 102 includes the substance number contained in the parts and the percentage content as the fields with the maker ID and the maker type as keys (type information). The environmental load information is not limited to the content information of the substance of each part that may induce the environmental load but may also include information of energy amount consumed for the production of the parts and information of the amount of emissions emitted during the production of the parts. Therefore, in the example shown in FIG. 8, fields of consumed energy and the amount of emissions are set in addition to the percentage contents of the ingredients. In this example, the parts C1 having a weight of 0.1 kg contains a 1% of a substance N1, 3% of a substance N2 and 10% of a substance N3, energy of 5 KW is consumed during production and 10 kg of an A substance is emitted.

The data selection filter 103 provided to the system 100 extracts the environmental load information about one or a plurality of type information associated with one parts number on the basis of the association of the parts number and the type information in the parts construction database 101 from the procurement parts data base 102. Therefore, the number of the end-parts is extracted by tracing back the master-slave relation from the master parts (=product) of the highest level of the parts construction database 101 down to the slave parts and reaching the parts below which the slave parts no longer exists. All the records of the procurement parts database 102 are extracted with the same parts number as the key for the parts umbers of the end-parts. Those records in which a plurality of type number information can be associated with the same parts number are extracted from the records so extracted and are transferred to the evaluation unit 1042. On the other hand, those records in which only one type number information can be associated with the same parts number are extracted from the records so extracted and are transferred to the parts totalization processing unit 106 (flow indicated by broken line in the drawing).

The evaluation processing unit 104 includes an evaluation rule storage unit 1041 storing an evaluation rule of the environmental load and the evaluation unit 1042 besides the data selection filter 103 described above. The evaluation unit 1042 receives the (record of) environmental load information of one or a plurality of type number information associated with one parts number from the data selection filter 103 and applies this environmental load information to the evaluation rule in the evaluation rule storage unit 1041. Next, whether or not the corresponding type number information can be an evaluation object type number of the environmental load representative of the parts number is judged.

When the record received from the data selection filter 103 is the type number information associated with only one parts number in the parts construction database 101, it is possible to judge this type number information as the evaluation object type number of the environmental load representative of the parts number. In this case, the record of the environmental load information is not directly sent (flow indicated by broken line in the drawing) from the data selection filter 103 to the parts totalization processing unit 106 but is transferred to the parts totalization processing unit 106 after the record is applied to the evaluation rule in the evaluation unit 1042 and the judgment is made as to whether or not it is the evaluation object type number.

As described above, the evaluation processing unit 1042 extracts the environmental load information associated with one or a plurality of type number information associated with one parts number by using the data selection filter 103 from the procurement parts database 102 on the basis of the association between the parts number of the type number information in the parts construction database 102. The evaluation unit 1042 applies the environmental load information so extracted to the evaluation rule in the evaluation rule storage unit 1041 and judges whether or not the corresponding type number information can be the evaluation object type number of the environmental load as the representative of the parts number.

The parts totalization processing unit 106 receives the record sent from the evaluation processing unit 104, that is, the environmental load information (environmental load information of the evaluation object type number) of the parts having the relation of one parts number with one type number information. Alternatively, the parts totalization processing unit 106 receives only the object type number information and may perform extraction from the procurement parts database 102. The parts totalization processing unit 106 totalizes the environmental load information of each evaluation object type number for each master parts or for each product on the basis of the parts construction database 101 and generates totalization information of the environmental load information.

The system 100 further includes an output processing unit 108 for outputting the totalization information generated by the parts totalization processing unit 106 to the output interface 107. The output processing unit 108 has a function of constituting the totalization information as screen information to be displayed on a display, for example. Alternatively, the output processing unit 108 merely converts the totalization information to a file format to be stored into a storage resource such as an HDD.

Furthermore, the system 100 may include an evaluation rule edition processing unit 105 for outputting an input interface for accepting edition of the evaluation rule in the evaluation rule storage unit 1041 to the output interface and for updating the evaluation rule in the evaluation rule storage unit 1041 on the basis of the edition information entered through the input interface. Incidentally, an example of the input interface is a GUI (Graphical User Interface).

The constituent portions 103, 104, 1041, 1042, 105, 106 and 108 explained so far may be accomplished either as hardware in the system 100 or as a program stored and executed in an appropriate storage device such as an HDD or a memory. In this case, an operating unit of the system 100 reads out the program from the storage device in parallel with the execution of the program and executes this program.

Incidentally, this embodiment assumes the case where the system 100 includes all of the parts construction database 101, the procurement parts database 102, the data selection filter 103, the evaluation processing unit 104, the evaluation rule edition processing unit 105, the parts totalization processing unit 106 and the output processing unit 108 but is not limited to this construction. For example, the invention may be achieved by a construction in which a part or a combination of these constituent units is arranged on a separate apparatus on the network and an appropriate management server or the evaluation processing unit 104 manages the operations of the constituent units. As to this network, a variety of networks such as a dedicated line, a WAN (Wide Area Network), a power line network, a wireless network, a public line network, a cellular telephone network, and so forth, can be employed besides the LAN and the Internet. When a virtual dedicated network technology such as VPN is employed, for example, communication having improved security can appropriately be established when the Internet is employed. Alternatively, it is possible to regard the bus wiring inside the same information processing unit as the network when each functional unit is arranged in this information processing unit.

Next, an actual procedure of the environmental load evaluation method in this embodiment will be explained with reference to the drawings. Various operations that correspond to the environmental load evaluation method to be explained below are accomplished by the program provided so that the storage means such as the memory and the HDD in the system 100 accomplish the function of each of the constituent units 103, 104, 105, 106 and 108 described above. The program has codes for executing the various operations to be explained below and packages the function of each constituent unit.

Figure 9:
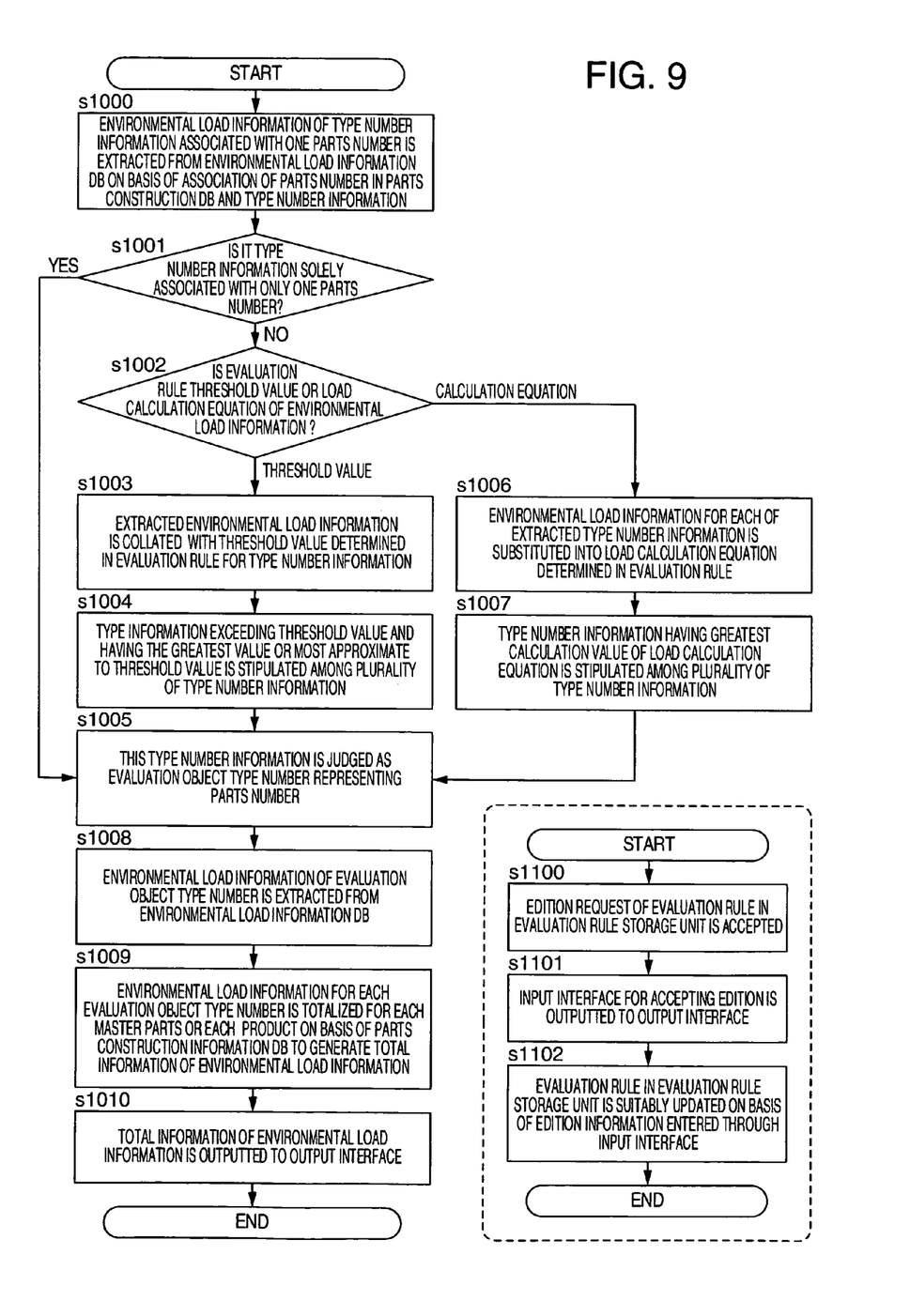
FIG. 9 shows an example of a main flow of an environmental load evaluation method in the embodiment of the invention.

To begin with, the main flow of the environmental load evaluation method in this embodiment will be explained. FIG. 9 shows an example of the main flow of the environmental load evaluation method in this embodiment. The evaluation processing unit 104 in the system 100 extracts the environmental load information of one or a plurality of type number information associated with one parts number from the procurement parts database 102 on the basis of the association of the parts number and the type number information in the parts construction database 101 (s1000).

Next, whether or not the environmental load information extracted in the step s1000 is the type number information solely associated with only one parts number is judged (s1001). When it is judged as the type number information solely associated with only one parts number (s1001: YES), the flow proceeds to the step s1005. When it is not judged as the type number information solely associated with only one parts number, on the other hand (s1001: NO), a processing for stipulating the type number information that can be the object of the environmental load evaluation from among a plurality of type number information associated with one parts number becomes necessary.

To execute this processing, whether the evaluation rule in the evaluation rule storage unit 1041 contains a threshold value of the environmental load information to be observed for each environmental load or a weight value of each environmental load information set in accordance with the attribute of the environmental load information and a load calculation equation containing this weight value is first judged (s1002).

When this step judges that the evaluation rule in the evaluation rule storage unit 1041 contains the threshold value of the environmental load information to be complied with for each environmental load (s1002: threshold value), the evaluation processing unit 104 collates the environmental load information extracted from the procurement parts database 102 in the step s1000 with the threshold value determined in the evaluation rule in the evaluation rule storage unit 1041 for each type number information (s1003).

Among a plurality of type number information, the environmental load information having the maximum threshold value or most approximate to the threshold value is stipulated (s1004). The type number information stipulated hereby is judged as the evaluation object type number of the environmental load representing the parts number (s1005).

When the evaluation rule in the evaluation rule storage unit 1041 is judged as containing the weight value of each environmental load information set in accordance with the attribute of the environment load information and the load calculation equation containing the weight value in the step s1002 (s1002: calculation formula), the evaluation processing unit 104 puts the environmental load information of each type number information extracted from the procurement parts database 102 in the step s1000 into the load calculation equation determined in the evaluation rule in the evaluation rule storage unit 1041 (s1006). The type number information having the greatest calculation value of the load calculation equation among a plurality of type number information is stipulated (s1007). Here, the type number information stipulated in this way is judged as the evaluation object type number representing the parts number (s1005).

The parts totalization processing unit extracts the environmental load information of the evaluation object type number from the procurement parts database 102 (s1008). Alternatively, the parts totalization processing unit acquires the environmental load information from the evaluation processing unit 104. The parts totalization processing unit totalizes the environmental load information of each evaluation object type number for each master part or for each product on the basis of the parts construction database 101 and generates the total information of the environmental load information (s1009). The total information of the environmental load information so generated is outputted from the output processing unit 108 to the output interface (s1010) and the flow is completed.

Separately from the flow described above, the evaluation rule edition processing unit 105 outputs the input interface accepting the edition of the evaluation rule in the evaluation rule storage unit 1041 to the output interface when receiving the edition request of the evaluation rule through the input interface. (s1100). There is also a flow in which the evaluation rule edition processing unit 105 updates the corresponding evaluation rule in the evaluation rule storage unit 1041 on the basis of the edition information entered through the input interface (s1102). And this flow is completed.

Next, the detailed processing content in the system 100 will be explained. The case where the parts number of the end-parts in the parts construction database 101 corresponds to the type number information on the 1:1 basis will be first assumed. As explained above, the state where the environmental load information is directly sent to the parts totalization processing unit 106 through the processing in the data selection filter 103 without executing the judgment in the evaluation unit 1042 is hereby assumed.

Figure 10:
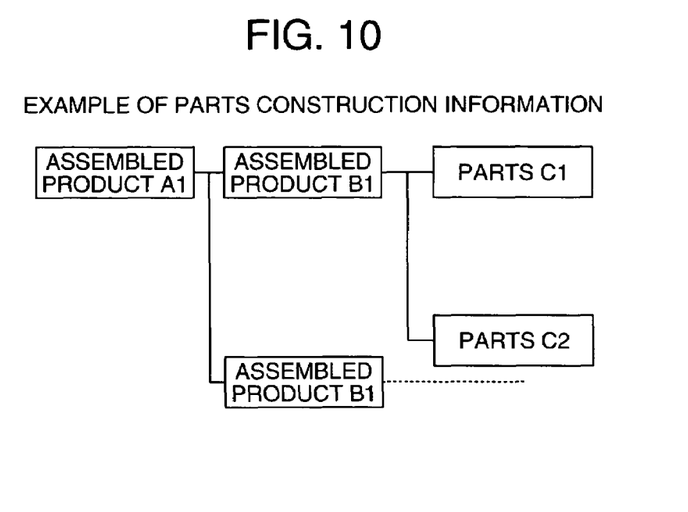
FIG. 10 is an explanatory view for explaining an example of parts construction information in the embodiment of the invention.
Figure 11:
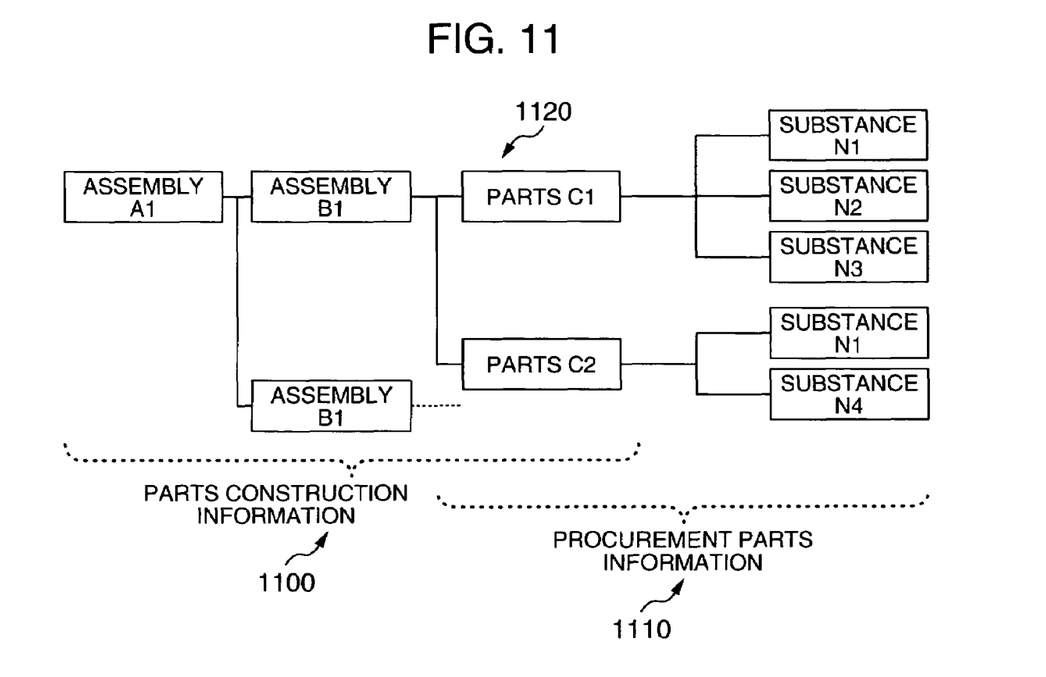
FIG. 11 is an explanatory view for explaining an example of construction information of all products in the embodiment of the invention.

FIG. 10 is an explanatory view for explaining an example of the parts construction information in this embodiment. It will be assumed that the procurement parts information exemplarily shown in FIGS. 5 to 8 exists for the example of the parts construction shown in FIG. 10. In this case, the records of the parts C1 and C2 (contained in table 301 in FIG. 6) are transferred from the data selection filter 103 to the parts totalization processing unit 106 along the flow of "one parts number: one part" shown in FIG. 1 (indicated by broken line in the drawing). As a result, the construction information of all the products shown in FIG. 11 is acquired. This drawing is an explanatory view for explaining an example of the construction information of all the products in this embodiment.

The tree structure 1100 expressed as the parts construction information and the procurement parts information 1110 (inclusive of the environmental load information) about the end-parts are combined with each other to form one large tree structure 1120 as shown in FIG. 11.

Figure 12:
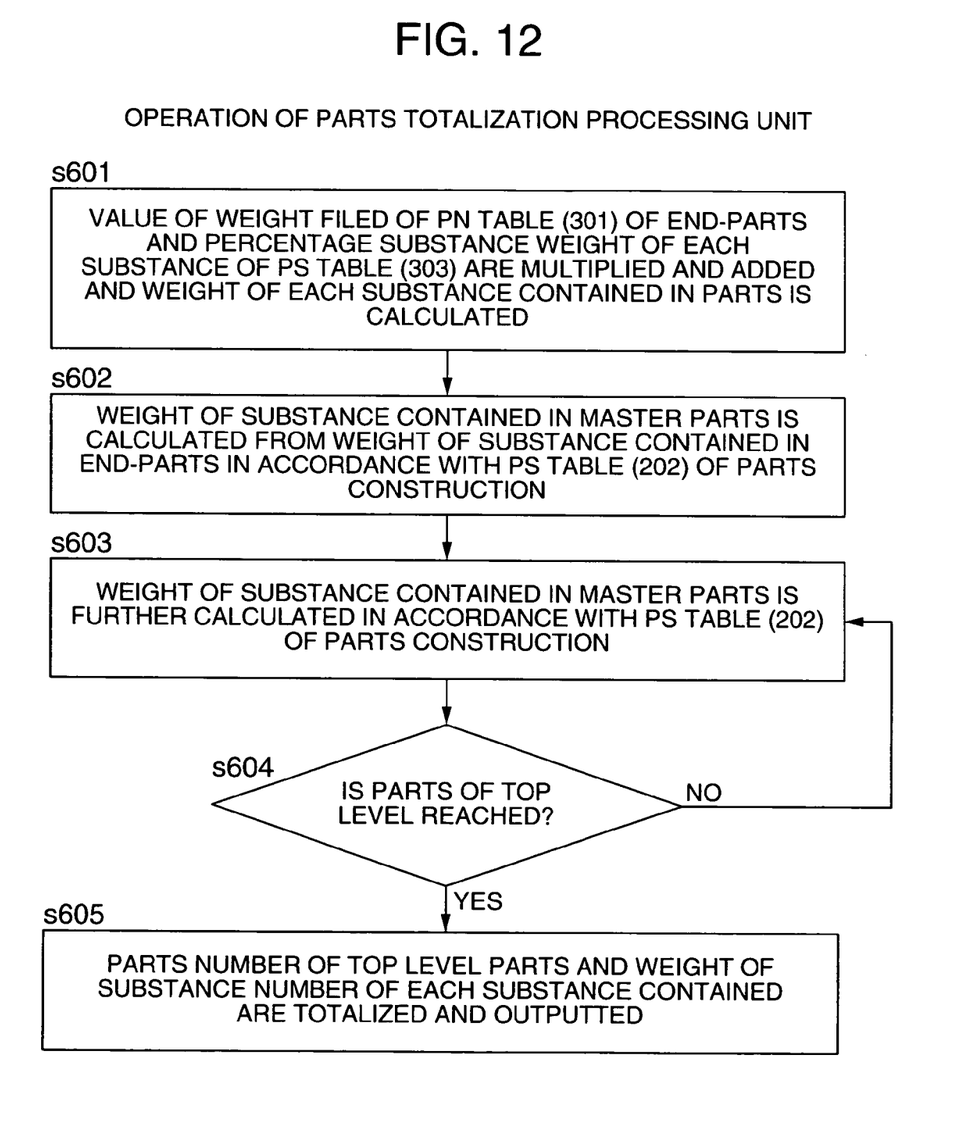
FIG. 12 is a flowchart for explaining an operation of a parts totalization processing unit in the embodiment of the invention.
Figure 13A:
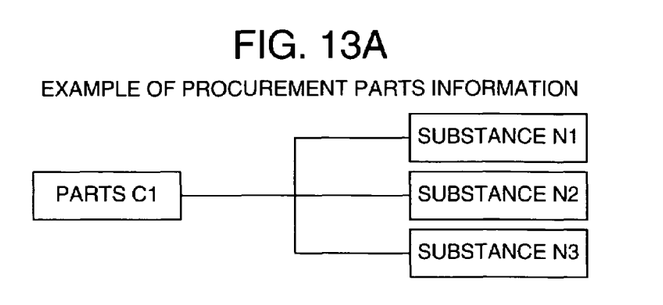
FIGS. 13A and 13B show an overall construction of procurement parts information under the state where a plurality of type numbers is associated with one parts number.
Figure 13B:
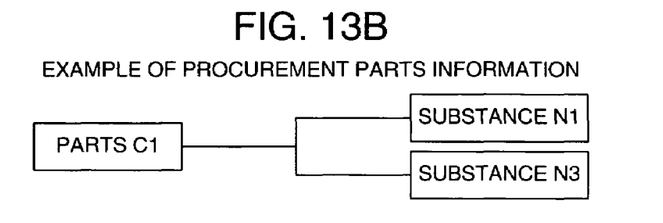
Figure 14:
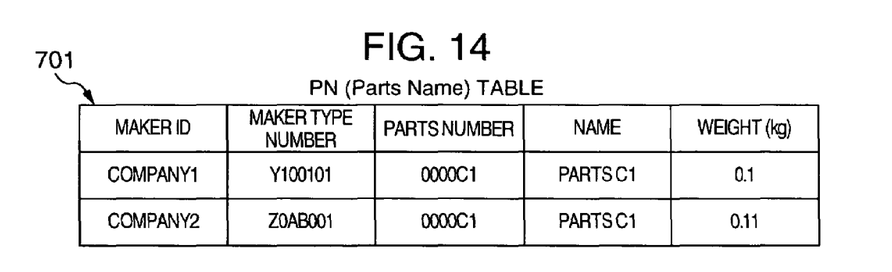
FIG. 14 shows an example of a parts name record of the procurement parts information under the state where a plurality of type numbers is associated with one parts number.
Figure 15:
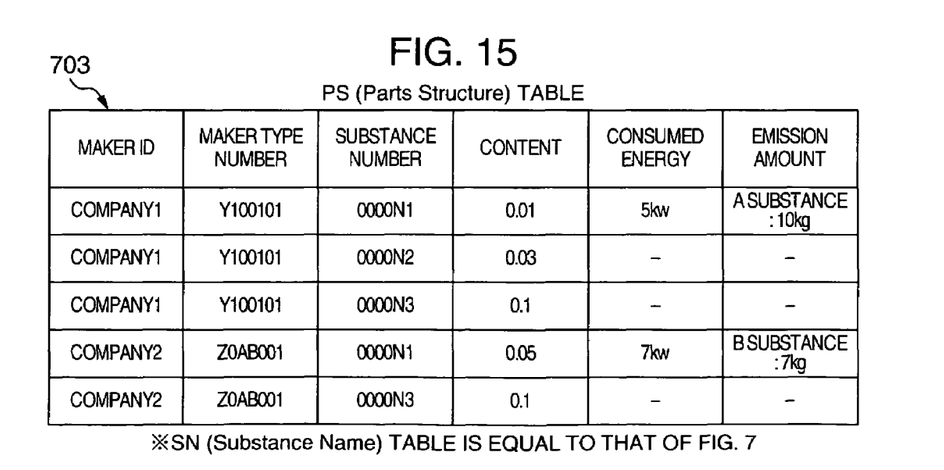
FIG. 15 shows an example of a parts structure record of the procurement parts information under the state where a plurality of type numbers is associated with one parts number.

The parts totalization processing unit 106 executes the totalization processing of the environmental load information in accordance with the flow shown in FIG. 12 on the basis of the tree structure 1120 obtained in this way. First, a product obtained by multiplying the value of the weight field of the PN table 301 of the end-part and the weight value of the percentage content substance for each substance of the PS table 303 is totalized for each substance and the weight of each substance contained in the end-part is calculated (s601).

Next, the weight of each substance contained in the master parts is calculated from the weights of the substances contained in the end-parts in accordance with the PS table 202 in the parts construction database 101 (s602). At this time, the same substance contained in a plurality of end-parts is totalized. Subsequently, the weight of each substance contained in the master parts is further calculated for the master parts for which the weight of each substance is calculated in the step s602 in accordance with the PS table 202 of the parts construction database 101 (s603).

Whether or not the calculation processing (s602 and s603) can reach the parts of the top level, that is, the product, is judged (s604). When the calculation processing cannot reach the parts of the top level (s604: NO), the step s603 is repeatedly executed.

When the calculation processing can reach the parts of the top level (s604: YES), the parts number of the parts of the top level and the weight for each substance number of the substance contained in the parts of the top level are totalized and are outputted in a file form, for example, to the output interface (s605). Total contents of the substance in the product are written as numerical values to this output file.

As described above, the state in which one type number information is not associated with one parts number or in other words, the state in which the end-parts cannot primarily be stipulated by the parts number but a plurality of end-parts (procured parts) are allocated to one parts number will be explained with reference to FIGS. 13A to 15.

FIGS. 13A to 15 shows the case where there are two makers "COMPANY 1" and "COMPANY 2" that supply "parts C1" having the same parts number, and two end-parts "Y100101" and "Z0AB001" having the same specification of the parts C1 exist. These two end-parts are the same from the aspect of the specification though their weight is somewhat different. However, the environmental load information such as the content information of the substance, consumed energy for the production and the emission amounts of emissions during production is different as shown in the PS table 703 in FIG. 15. Namely, SN (Substance Name) table is equal to that of FIG. 7.

In such a case, the data selection filter 103 in the evaluation processing unit 104 extracts a record group 701 about two end-parts from the procurement parts database 102 and delivers it to the evaluation unit 1042. The operation of this evaluation unit 1042 will be explained with reference to FIG. 16. The evaluation unit 1042 collates the record group 701 delivered by the data selection filter 103 with the PS table 703 and generates a record group of a form shown in Table 801.

Figure 16:
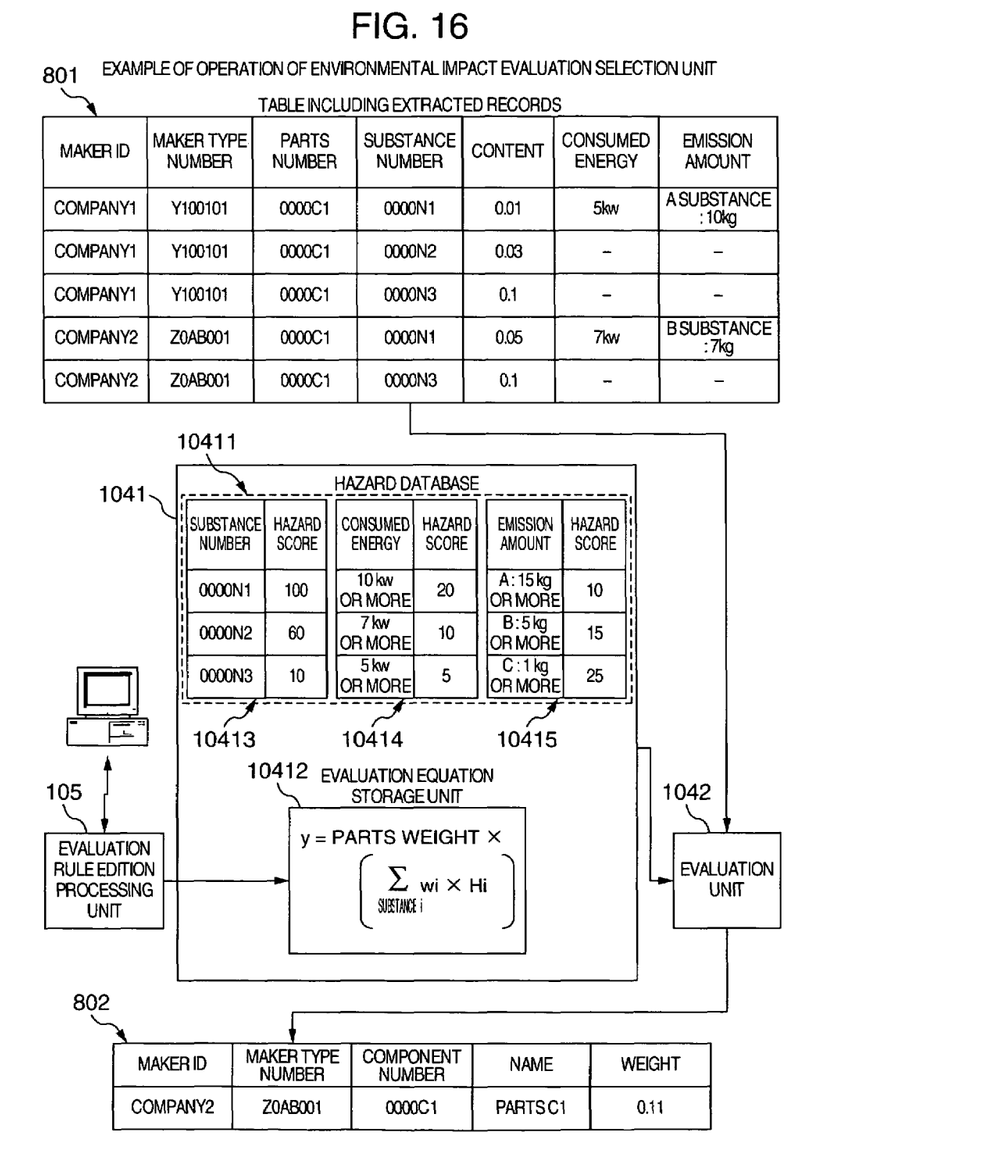
FIG. 16 shows an example 1 of an operation of an environmental impact evaluation selection processing unit in the embodiment of the invention.

Each record in the record group has the same parts number field though the maker type number is different. The evaluation unit 1042 performs comparison evaluation of the records having different maker type numbers for these record groups. This comparison evaluation is executed in accordance with a rule stored in advance in the valuation rule storage unit 1041.

Here, a hazard database 10411 and an evaluation equation 10412 (load calculation equation) are provided and each can accept definition and edition from a user by the function of GUI of the evaluation rule edition processing unit 105. In the example shown in the drawing, the hazard database 10411 stores a hazard score 10413 for each substance number, a hazard score 10414 for each consumed energy and a hazard score 10415 for each emission amount of an emission. It is deemed that the higher this hazard score, the greater the load applied to the environment.

As an example of an equation for evaluating an environmental impact evaluation degree y of one parts on the basis of such a hazard database 10411, an equation that totalizes the contents (those which apply the load to the environment) contained in the parts by multiplying a content wi of a substance i by the hazard score Hi is shown in the evaluation equation storage unit 10412. Needless to say, not only the content wi of the substance but also consumed energy and the emission amount of the emission can be set to the first term of the equation described above.

The evaluation unit 1042 calculates the environmental impact evaluation degree y of the parts by using the equation and compares a plurality of end-parts having one parts number with one another. In the case of the example shown in FIG. 16, the equation of the evaluation equation storage unit 10412 is applied to the end-parts "Y100101" provided by "COMPANY 1" and an environmental impact evaluation degree y1 expressed by "parts weight 0.1×(substance N1 content 0.01×hazard score 100+substance N2 content 0.03×hazard score 60+substance N3 content 0.1×hazard score 10)=0.38" can be acquired.

The equation of the evaluation equation storage unit 10412 is further applied to the end-parts "Y100101" provided by "COMPANY1" and an environmental impact evaluation degree y2 expressed by "parts weight 0.1×(consumed energy 5×hazard score 5+emission amount of emission 10×hazard score 10=12.5" can be acquired. The sum of these y1 and y2 is 0.38+12.5=12.88. This value is the environmental impact evaluation degree y of the end-parts "Y100101" provided by "COMPANY 1".

On the other hand, the equation of the evaluation equation storage unit 10412 is applied to the end-parts "Z0AB001" provided by "COMPANY 2" and an environmental impact evaluation degree y1 expressed by "parts weight 0.11× (substance N1 content 0.05×hazard score 100+substance N3 content 0.1×hazard score 10)=0.66" can be acquired.

The equation of the evaluation equation storage unit 10412 is further applied to the end-parts "Z0AB001" provided by "COMPANY2" and an environmental impact evaluation degree y2 expressed by "parts weight 0.11× (consumed energy 7×hazard score 10+emission amount of emission 7×hazard score 15=19.25" can be acquired. The sum of these y1 and y2 is 0.66+19.25= 19.91. This value is the environmental impact evaluation degree y of the end-parts "Z0AB001" provided by "COMPANY 2".

Therefore, the environmental impact evaluation degree y of the end parts "Y100101" provided by "COMPANY 1" and the environmental impact evaluation degree y of the end parts "Z0AB001" provided by "COMPANY 2" are compared and the latter having a higher environmental impact evaluation degree, that is, the end-parts "Z0AB001" provided by "COMPANY 2", is stipulated as the type number of the evaluation object.

Figure 17:
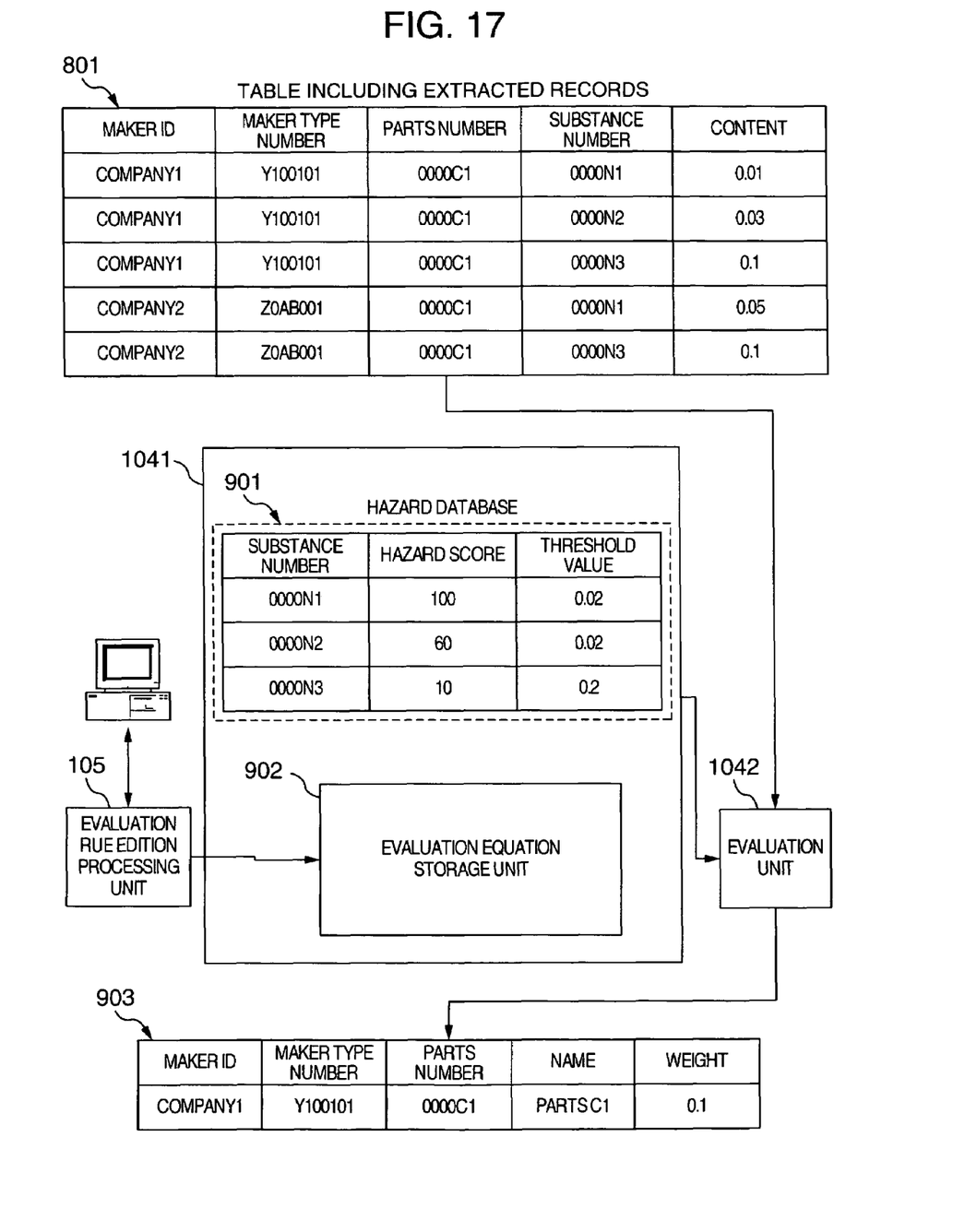
FIG. 17 shows an example 2 of an operation of the environmental impact evaluation selection processing unit in the embodiment of the invention.

As a result, the evaluation unit 1042 extracts the record 802 to which the environmental load information of the end-parts Z0AB001 is allocated as the parts number 0000C1 as shown in FIG. 17. Incidentally, when the environmental impact evaluation degree y is equal among the end-parts, one end-part is extracted in accordance with a predetermined rule (for example, a rule that selects the parts first evaluated).

After one part (end-part) is allocated to one parts number by the evaluation processing unit 104, the record 802 is delivered to the parts totalization processing unit 106 and is subjected to a similar totalization processing in accordance with the flow of FIG. 12 already explained.

Figure 18:
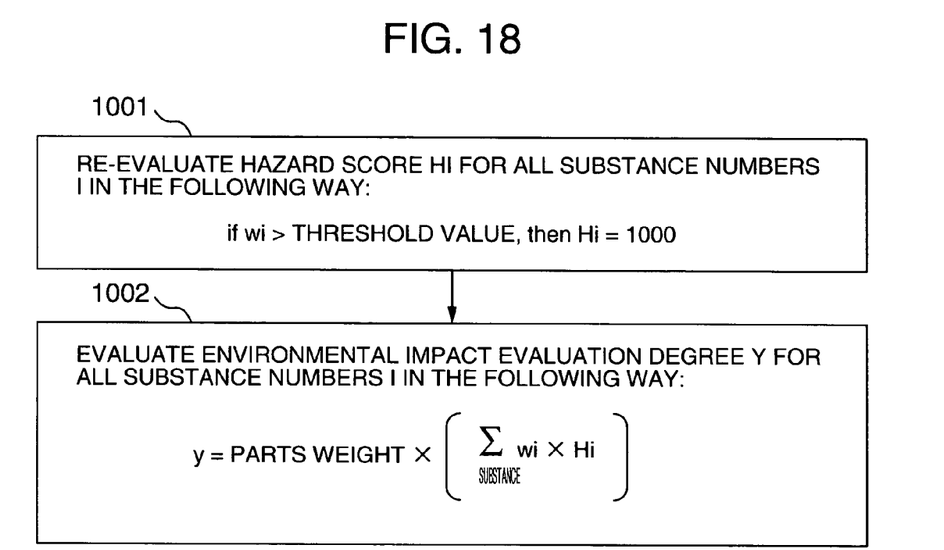
FIG. 18 shows a partial flowchart of the operation example 2 in the embodiment of the invention.

Another embodiment can be assumed, too. FIG. 17 shows an operation example 2 of the environmental impact evaluation processing unit in this embodiment. FIG. 18 shows a partial flow of the operation example 2 in the embodiment. This embodiment assumes the case where the evaluation rule in the evaluation rule storage unit 1041 contains the threshold value of the environmental load information that is determined for each environmental load and is to be complied with.

Concretely, the threshold value of the content for each substance is stored in advance in the hazard database 901 of the evaluation rule storage unit 1041, for example, and an evaluation equation taking this value into consideration is stored in 902. FIG. 18 shows the detail of the evaluation equation. Here, the hazard score Hi is not set in accordance with the level of the content but a high hazard score of 1,000 is equally allocated to the contents exceeding a certain threshold value (1001). The environmental impact evaluation degree is calculated by using the result (1002). Incidentally, when Wi is below the threshold value, the processing can be executed in the same way as the processing content shown in FIG. 16.

When the evaluation unit 1042 executes the processing by applying the rule described above, the record of the end-parts Y100101 exceeding the threshold value 0.2 of the substance number 0000N2 is extracted as the evaluation object, for example.

The explanation given above has primarily been made about totalization of the chemical substances contained in the product by way of example but the invention can similarly be applied to LCA that builds up the environmental load information of the product from the parts. Furthermore, the invention can be applied in exactly the same way to totalization of material components besides the substances.

The invention can precisely judge which environmental load information of the product should be evaluated on the basis of which parts even when a plurality of parts having different contents of those substances which have the same function and the same parts number but which may apply the environmental impact load.

Therefore, precise design, parts procurement and production can be carried out in such a fashion that amounts of cadmium, mercury, hexavalent cadmium and lead contained in a product fall within predetermined amounts, for example, in the light of the European ROHS Directive (The Restriction of Hazardous Substances Directive) stipulating as its basic concept that new products of electric appliances should not contain heavy metals such as lead, mercury, cadmium and hexavelent chromium, and bromide flame retardants pbb and pbde should not be used in principle. In other words, information management suitable for content evaluation of the environmental impact substances and environmental load inventory evaluation can be made.

Therefore, the invention can provide an information management technology that will be suitable for evaluating environmental load information of products. More concretely, the invention makes it possible to appropriately handle those parts which have different environmental load characteristics though they have the same parts number, in the environmental load evaluation.

Although the invention has thus been explained in its preferred form, it is to be understood that the invention is not limited thereto but various changes and modifications may be made without departing from the spirit and scope the invention.

What is claimed is:

1. A system which evaluates an environmental load of a product, comprising:

a parts construction database which stores a parts number determined for specification of each parts constituting said product, type number information determined for each parts constituting said product and information of a master-slave relation between a master parts and slave parts constituting said master parts, in association with one another;

an environmental load information database which stores environmental load information of said parts constituting said product for each of said type number information;

an evaluation rule storage unit which stores an evaluation rule of an environmental load;

an evaluation processing unit which extracts from said environmental load information database environmental load information relating to one or a plurality of type number information associated with one parts number on the basis of association of a parts number and type number information in said parts construction database, applying the environmental load information so extracted to the evaluation rule of said evaluation rule storage unit and judging whether or not corresponding type number information can be an evaluation object type number of the environmental load as a representative of the parts number;

a parts totalization processing unit which extracts the environmental load information of said evaluation object type number from said environmental load information database, totalizing the environmental load information for each of said evaluation object type numbers for each master parts or for each product on the basis of said parts construction database and generates total information of the environmental load information; and an output processing unit which outputs the total information of said environmental load information to an output interface.

2. A system which evaluates an environmental load of a product according to claim 1, further comprising: an evaluation rule edition processing unit which outputs an input interface which accepts edition of an valuation rule in said evaluation rule storage unit to the output interface and updating the evaluation rule in said evaluation rule storage unit on the basis of edition information entered through said input interface.

3. A system which evaluates an environmental load of a product according to claim 1, wherein said evaluation processing unit searches the type number information solely associated with only one parts number in said parts construction database and judges the type number information searched as an evaluation object type number of the environmental load representing the parts number.

4. A system which evaluates an environmental load of a product according to claim 1, wherein the evaluation rule in said evaluation rule storage unit contains a threshold value of environmental load information determined for each environmental load and to be complied with, and wherein said evaluation processing unit extracts environmental load information relating to a plurality of type number information associated with one parts number from said environmental load information database on the basis of association of the parts number and the type number information in said parts construction database, queries the environmental load information extracted for each threshold value determined by the valuation rule in said evaluation rule storage unit and for each type number information, stipulates the type number information the environmental load information of which exceeds said threshold value and is the greatest, or is most approximate to said threshold value among a plurality of type number information, and judges the type number information stipulated as an evaluation object type number of the environmental load representing the parts number.

5. A system which evaluates an environmental load of a product according to claim 1, wherein the evaluation rule in said evaluation rule storage unit includes a weight value for each environmental load information set in accordance with attributes of the environmental load information and a load calculation equation containing the weight value, and wherein said evaluation processing unit extracts the environmental load information relating to a plurality of type number information associated with one parts number from said environmental load information database on the basis of association of the parts number and the type number information in said parts construction database, substitutes the environmental load information for each type number information hereby extracted into the load calculation equation determined in the evaluation rule of said evaluation rule storage unit, stipulates type number information having the greatest calculation value of said load calculation equation among said plurality of type number information and judges said type number information stipulated as an evaluation object type number representing the type number.

6. A system which evaluates an environmental load of a product according to claim 1, wherein said environmental load information contains any of a content of a substance generating an environmental load for each part, an amount of energy required for producing the parts and an amount of emission emitted during production of the parts.

7. A method of evaluating an environmental load of a product by use of an information processing unit including a parts construction database which stores a parts number determined for specification of each parts constituting said product, type number information determined for each parts constituting said product and information of a master-slave relation between a master parts and slave parts constituting said master parts, in association with one another; an environmental load information database which stores environmental load information of said parts constituting said product for each of said type number information; and an evaluation rule storage unit which stores an evaluation rule of an environmental load;

said method comprising the steps of:

extracting from said environmental load information database environmental load information relating to one or a plurality of type number information associated with one parts number on the basis of association of a parts number and type number information in said parts construction database, applying the environmental load information extracted to the evaluation rule of said evaluation rule storage unit and judging whether or not corresponding type number information can be an evaluation object type number of the environmental load as a representative of the parts number;

extracting the environmental load information of said evaluation object type number from said environmental load information database, totalizing the environmental load information for each of said evaluation object type numbers for each master parts or for each product on the basis of said parts construction database and generating total information of the environmental load information; and outputting the total information of said environmental load information to an output interface.

8. A computer program product, residing on a computer readable medium, which executes the step of evaluating an environmental load of a product by use of an information processing unit including a parts construction database which stores a parts number determined for specification of each parts constituting said product, type number information determined for each parts constituting said product and information of a master-slave relation between a master parts and slave parts constituting said master parts, in association with one another; an environmental load information database which stores environmental load information of said parts constituting said product for each of said type number information; and an evaluation rule storage portion which stores an evaluation rule of an environmental load; said program comprising the steps of: extracting from said environmental load information database environmental load information relating to one or a plurality of type number information associated with one parts number on the basis of association of a parts number and type number information in said parts construction database, applying the environmental load information so extracted to the evaluation rule of said evaluation rule storage unit and judging whether or not corresponding type number information can be an evaluation object type number of the environmental load as a representative of the parts number extracting the environmental load information of said evaluation object type number from said environmental load information database, totalizing the environmental load information for each of said evaluation object type numbers for each master parts or for each product on the basis of said parts construction database and generating total information of the environmental load information; and outputting the total information of said environmental load information to an output interface.

* * * * *